United States Patent
Lei et al.

(10) Patent No.: US 10,795,579 B2
(45) Date of Patent: Oct. 6, 2020

(54) METHODS, APPARATUSES, SYSTEM AND COMPUTER PROGRAM PRODUCTS FOR RECLAIMING STORAGE UNITS

(71) Applicant: EMC IP Holding Company LLC, Hopkinton, MA (US)

(72) Inventors: Lu Lei, Shanghai (CN); Ao Sun, Shanghai (CN); Wesley Wei Sun, Shanghai (CN); Gary Jialei Wu, Shanghai (CN); Yu Teng, Shanghai (CN); Chun Xi Kenny Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/358,615

(22) Filed: Mar. 19, 2019

(65) Prior Publication Data
US 2020/0104054 A1    Apr. 2, 2020

(30) Foreign Application Priority Data
Sep. 30, 2018   (CN) .......................... 2018 1 1157714

(51) Int. Cl.
*G06F 3/06*     (2006.01)
(52) U.S. Cl.
CPC .......... *G06F 3/0608* (2013.01); *G06F 3/067* (2013.01); *G06F 3/0644* (2013.01); *G06F 3/0659* (2013.01)
(58) Field of Classification Search
CPC ...... G06F 3/0608; G06F 3/0659; G06F 3/067; G06F 3/0644
See application file for complete search history.

(56) References Cited

U.S. PATENT DOCUMENTS

| | | | |
|---|---|---|---|
| 9,880,746 B1* | 1/2018 | Shilane | G06F 3/0611 |
| 9,891,994 B1* | 2/2018 | Schneider | G06F 11/1076 |
| 9,892,014 B1* | 2/2018 | Hickey | G06F 11/3452 |

(Continued)

FOREIGN PATENT DOCUMENTS

CN    110968417 A    4/2020

OTHER PUBLICATIONS

China Publication and Entering Examination Procedure received China Patent Application No. CN201811157714.8 dated Apr. 13, 2020, 1 page.

*Primary Examiner* — Christopher D Birkhimer
(74) *Attorney, Agent, or Firm* — Amin, Turocy & Watson, LLP

(57) ABSTRACT

Embodiments of the present disclosure provide methods, apparatuses, a system and computer program products for managing storage units. According to embodiments of the present disclosure, it is determined whether a first storage unit allocated at a first node is reclaimable, wherein data in the first storage unit is backed up to a second storage unit at a second node. In response to determining that the first storage unit is reclaimable, a condition to be satisfied for reclaiming the second storage unit is determined. A command indicating the condition is sent to the second node, such that the second node reclaims the second storage unit in response to the condition being satisfied. Moreover, in response to the command being sent, the first storage unit is reclaimed. The embodiments of the present disclosure enable timely reclaiming of storage units, thereby improving utilization of the storage space effectively.

20 Claims, 8 Drawing Sheets

(56) References Cited

U.S. PATENT DOCUMENTS

| | | | |
|---|---|---|---|
| 9,904,480 B1* | 2/2018 | Singh | G06F 16/128 |
| 9,934,237 B1* | 4/2018 | Shilane | G06F 11/1453 |
| 9,940,460 B1* | 4/2018 | Derbeko | G06F 11/1458 |
| 9,952,785 B2* | 4/2018 | Qiao | G06F 3/0619 |
| 9,971,648 B1* | 5/2018 | Schneider | G06F 11/1076 |
| 9,971,797 B1* | 5/2018 | Kumar | G06F 16/2228 |
| 9,977,718 B1* | 5/2018 | Kulkarni | G06F 11/1453 |
| 9,984,090 B1* | 5/2018 | Shang | G06F 16/13 |
| 9,990,253 B1* | 6/2018 | Rajimwale | G06F 11/1435 |
| 9,996,426 B1* | 6/2018 | Pogde | G06F 16/172 |
| 9,996,540 B2* | 6/2018 | Mitra | G06F 16/1805 |
| 10,019,323 B1* | 7/2018 | Bai | G06F 11/1004 |
| 10,019,447 B1* | 7/2018 | O'Connell | G06F 16/27 |
| 10,025,667 B2* | 7/2018 | Wu | G06F 3/0689 |
| 10,042,719 B1* | 8/2018 | Chopra | G06F 11/1466 |
| 10,055,420 B1* | 8/2018 | Pogde | G06F 11/1448 |
| 10,078,598 B1* | 9/2018 | Wallace | G06F 12/0808 |

* cited by examiner

METHODS, APPARATUSES, SYSTEM AND COMPUTER PROGRAM PRODUCTS FOR RECLAIMING STORAGE UNITS

RELATED APPLICATION

The present application claims the benefit of priority to Chinese Patent Application No. 201811157714.8, filed on Sep. 30, 2018, which application is hereby incorporated into the present application by reference herein in its entirety.

FIELD

Embodiments of the present disclosure generally relate to data storage, and more specifically, to methods, apparatuses, a system and computer program products for managing storage units.

BACKGROUND

The current storage system typically provides additional protection for user data by means of offsite backup. When a fault or disaster occurs, the storage system needs to ensure that the data within a recovery point object (RPO) are completely recoverable. The RPO is a measure of how much production data is allowed to be lost when a fault or disaster occurs, which can be described as a maximum amount of data loss that the system can tolerate.

In order to achieve the above object, when a storage unit allocated locally in a storage system has a remote copy, its storage space cannot be released immediately even though the deletion is performed on the local storage unit. Due to the transmission delay between the two locations, when a delete operation is performed on the local storage unit, the delete operation cannot usually be immediately applied to the remote copy. Therefore, if the storage space occupied by the local storage unit is reclaimed before the deletion operation is applied to the remote copy, data loss may probably occur.

SUMMARY

Embodiments of the present disclosure provide methods, apparatuses, a system and computer program products for managing storage units.

In a first aspect of the present disclosure, there is provided a method of managing storage units. The method comprises: determining whether a first storage unit allocated at a first node is reclaimable, wherein data in the first storage unit is backed up to a second storage unit at a second node; in response to determining that the first storage unit is reclaimable, determining a condition to be satisfied for reclaiming the second storage unit; sending a command indicating the condition to the second node, such that the second node reclaims the second storage unit in response to the condition being satisfied; and in response to the command being sent, reclaiming the first storage unit.

In a second aspect of the present disclosure, there is provided a method for managing storage units. The method comprises: receiving, at a second node, a command to reclaim a second storage unit at the second node from a first node, wherein data in a first storage unit at the first node is backed up to the second storage unit; determining, from the command, a condition to be satisfied for reclaiming the second storage unit; and in response to the condition being satisfied, reclaiming the second storage unit.

In a third aspect of the present disclosure, there is provided an apparatus for managing storage units. The apparatus comprises at least one processing unit and at least one memory. The at least one memory is coupled to the at least one processing unit and stores an instruction executed by the at least one processing unit. The instruction, when executed by the at least one processing unit, causes the apparatus to execute acts comprising: determining whether a first storage unit allocated at a first node is reclaimable, wherein data in the first storage unit is backed up to a second storage unit at a second node; in response to determining that the first storage unit is reclaimable, determining a condition to be satisfied for reclaiming the second storage unit; sending a command indicating the condition to the second node, such that the second node reclaims the second storage unit in response to the condition being satisfied; and in response to the command being sent, reclaiming the first storage unit.

In a fourth aspect of the present disclosure, there is provided an apparatus for managing storage units. The apparatus comprises at least one processing unit and at least one memory. The at least one memory is coupled to the at least one processing unit and stores an instruction executed by the at least one processing unit. The instruction, when executed by the at least one processing unit, causes the apparatus to execute acts comprising: receiving, at a second node, a command to reclaim a second storage unit at the second node from a first node, wherein data in a first storage unit at the first node is backed up to the second storage unit; determining, from the command, a condition to be satisfied for reclaiming the second storage unit; and in response to the condition being satisfied, reclaiming the second storage unit.

In a fifth aspect of the present disclosure, there is provided a storage system. The storage system comprises at least a first node and a second node, the first node being communicatively coupled to the second node. The first node comprises at least the apparatus according to the third aspect of the present disclosure, and the second node comprises at least the apparatus according to the fourth aspect of the present disclosure.

In a sixth aspect of the present disclosure, there is provided a computer program product. The computer program product is tangibly stored in a non-transient computer storage medium and comprises machine executable instructions. The machine executable instructions, when executed by a device, cause the device to perform any step of the method according to the first aspect of the present disclosure.

In a seventh aspect of the present disclosure, there is provided a computer program product. The computer program product is tangibly stored in a non-transient computer storage medium and comprises machine executable instructions. The machine executable instructions, when executed by a device, cause the device to perform any step of the method according to the second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent, through the following detailed description of the example embodiments of the present disclosure with reference to the accompanying drawings, in which the same reference symbols generally refer to the same elements.

Throughout the drawings, the same or similar reference symbols refer to the same or similar elements.

DETAILED DESCRIPTION OF EMBODIMENTS

Preferred embodiments of the present disclosure will now be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one embodiment" and "the embodiment" are to be read as "at least one embodiment." The term "another embodiment" is to be read as "at least another embodiment." The terms "first," "second," and the like may refer to different or the same objects. Other definitions, either explicit or implicit, may be included below.

As described above, when a storage unit allocated in a storage system locally has a remote copy, its storage space cannot be released immediately even though the deletion is performed on the local storage unit. Due to the transmission delay between the two locations, when a delete operation is performed on the local storage unit, the delete operation cannot usually be immediately applied to the remote copy. Therefore, if the storage space occupied by the local storage unit is reclaimed before the deletion operation is applied to the remote copy, data loss may probably occur.

Figure 1A:
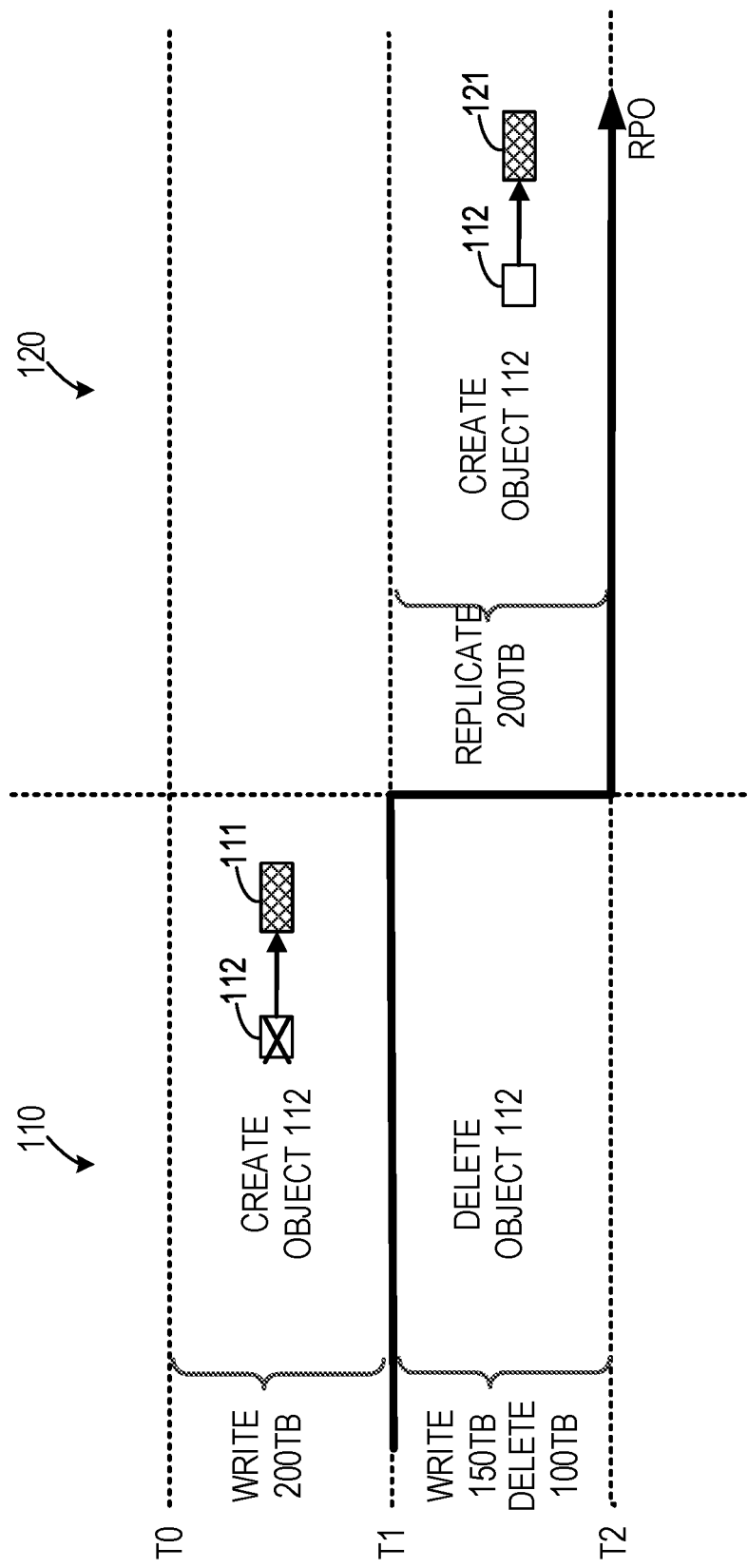
FIGS. 1A-1B are schematic diagrams showing management of storage units supporting offsite backup in the legacy solution.
Figure 1B:
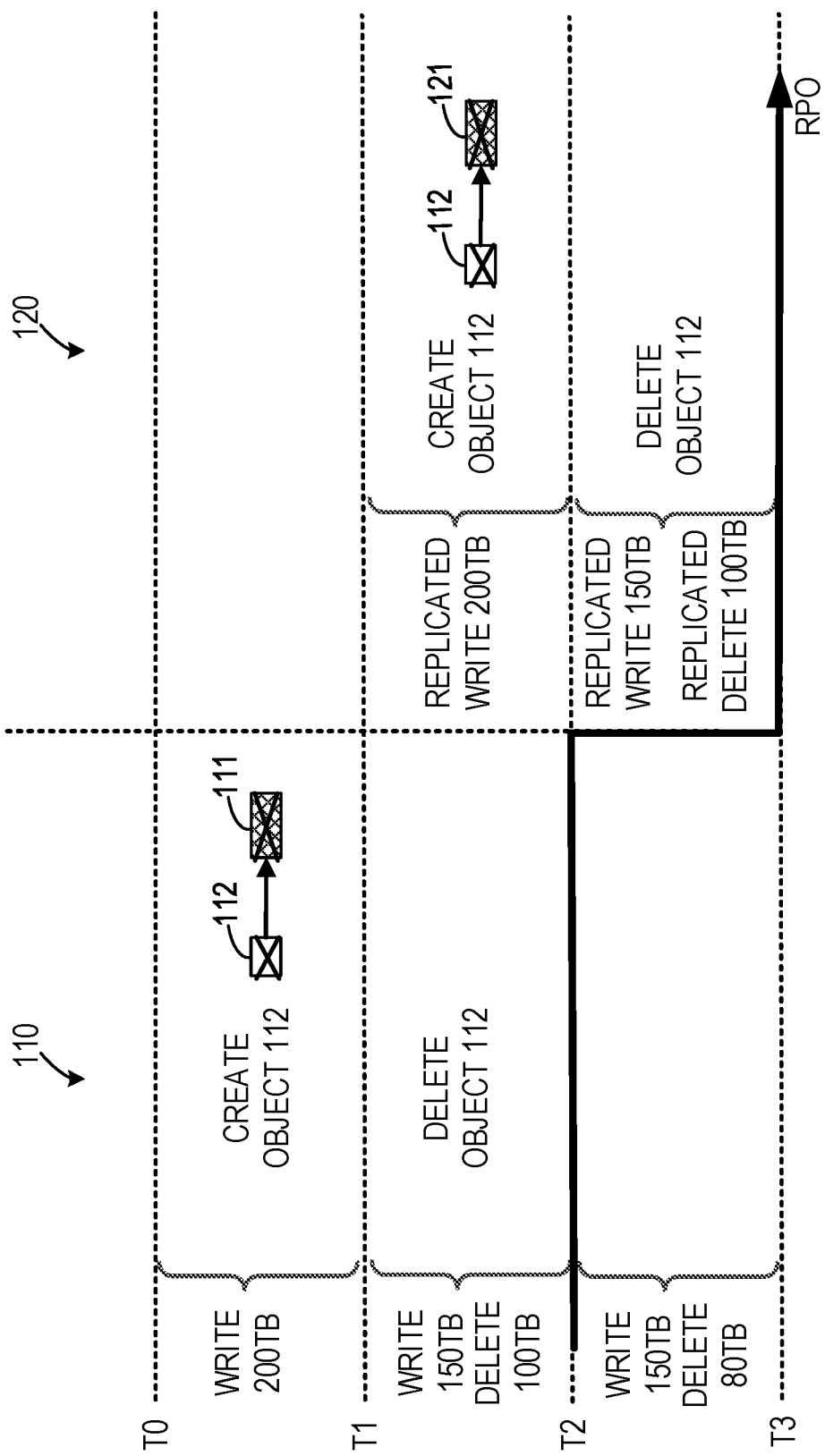

FIGS. 1A and 1B illustrate such an example. In FIGS. 1A and 1B, it is assumed that a storage system supporting geo-replication is provisioned at a time point T0. For example, the storage system supports data backup across a zone 110 and a zone 120 (hereinafter referred to as domain 110 and domain 120).

As shown in FIG. 1A, from the time point T0 to a time point T1, a user writes 200 TB user data into the domain 110.

For example, during the period, an object 112 is created and data corresponding thereto is stored on a storage unit 111. Only for the purpose of illustration, it is assumed herein that the storage unit 111 is only used for storing a single object 122. At a time point T2, all object creating operations and 200 TB user data are successfully replicated to the domain 120. For example, the object 112 is created in the domain 120 and data corresponding thereto is stored on the storage unit 121. The object 112 in the domain 120 acts as a backup copy of the object 112 in the domain 110. As such, all operations before the time point T1 are executed in the domain 110 and the domain 120 and thus can be included in the system PRO.

As shown in FIG. 1A, from the time point T1 to the time point T2, while waiting for all object creation operations and 200 TB user data to be replicated to the domain 120, the user writes further 150 TB data into the domain 110 and deletes 100 TB user data from the 200 TB user data written from the time point T0 to the time point T1. For example, the object 112 created before the time point T1 is deleted during this period. Since the user data and operations generated between the time point T1 and the time point T2 have not yet been replicated to the domain 120 (for example, during waiting for transmission or during the transmission), the domain 120 is not aware of deletion of the object 112. Hence, at the time point T2, even though the object 112 has been deleted from the domain 110, the space of the storage unit 111 is still unable to be released, since the system RPO only includes creation of the objection 112.

For example, assuming that the space of the storage unit 111 is released immediately at the time point T2 and the user data generated from the time point T1 to the time point T2 are synchronized to the domain 120 earlier than the operation of deleting the object 112, it may occur at the domain 120 that the storage space 121 is released but the object 112 has not been deleted yet. At this time, if a disaster occurs in the domain 110, the data of the domain 120 will be used for system recovery. In this case, although the object 112 still exists (it is within the RPO), the data corresponding thereto has been lost and cannot be recovered.

Therefore, in the legacy solution, the space of the storage unit 111 can be released until the time point when the operation of deleting the object 112 is synchronized to the domain 120. For example, as shown in FIG. 1B, at a time point T3, the user data and the operations generated from the time point T1 to the time point T2 are successfully replicated to the domain 120. So far, all the operations before the time point T2 have been executed in both the domain 110 and the domain 120, and thus can be included in the system RPO. At this time, the spaces of the storage units 111 and 121 can be released.

From the above example, it can be seen that, in the legacy solution, the delay of the remote backup may result in storage units being unable to be reclaimed in time. For example, at the time point T2, the domain 110 only has 250 (i.e., 200+150−1000=250) TB valid data but occupies a 350 (i.e., 200+150) TB storage space. If a large amount of deletion operations occur in the domain 110 and there is a great transmission delay due to a slow network transmission rate, the waste of such storage space will be enormous.

Embodiments of the present disclosure provide a solution of managing storage units to solve the above problem and one or more of other potential problems. The solution can realize timely reclaiming of storage units in the case of remote backup, thereby improving the utilization of storage space effectively.

Figure 2:
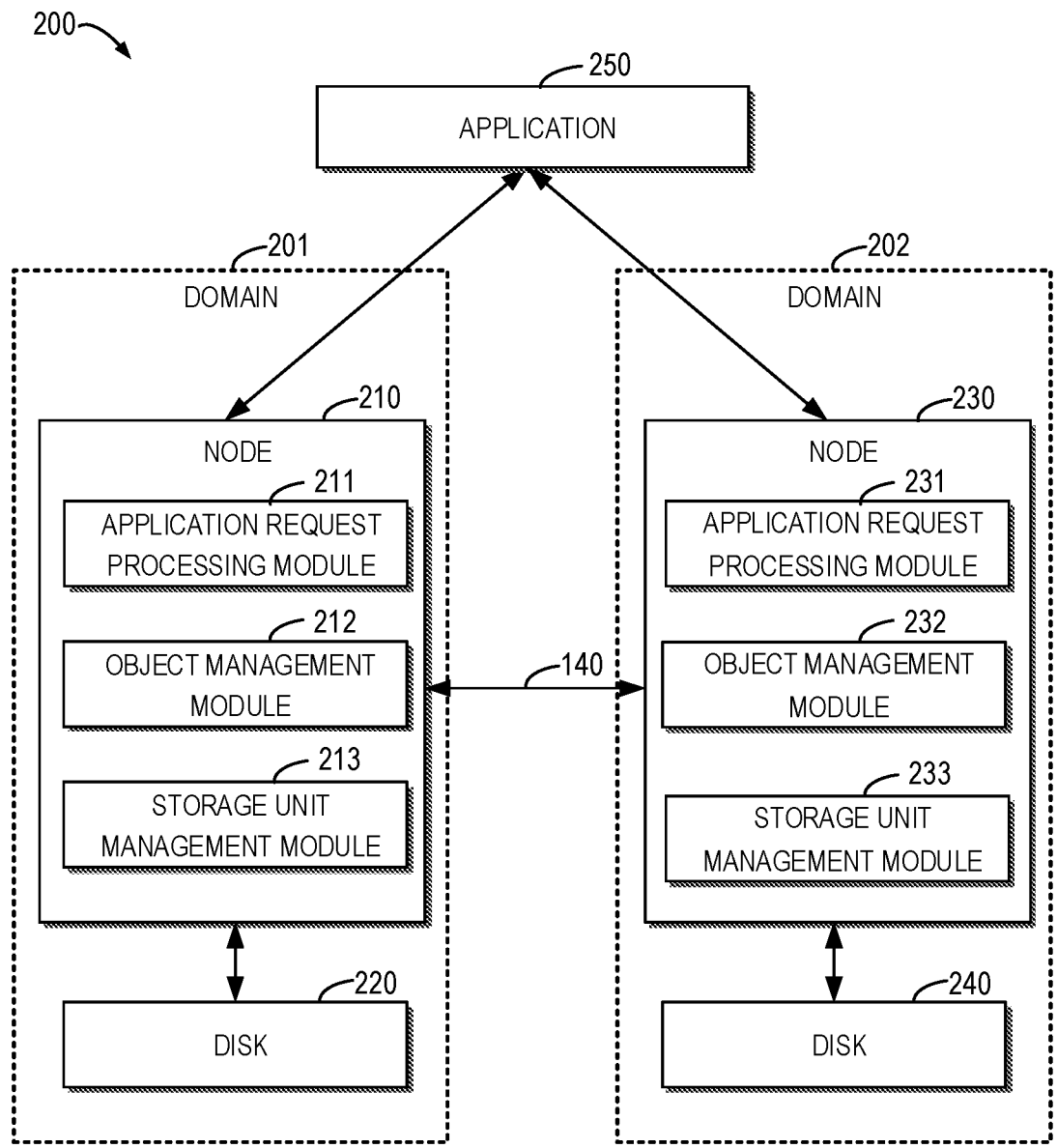
FIG. 2 illustrates an architecture diagram of a storage system according to embodiments of the present disclosure.

FIG. 2 illustrates an architecture diagram of a storage system 200 according to embodiments of the present disclosure. It is to be understood that the structure and the functionality of the storage system 200 as shown in FIG. 2 are provided only for the purpose of illustration, without suggesting any limitation to the scope of the present disclosure. The embodiments of the present disclosure can be embodied in different structures and/or functionalities.

As shown in FIG. 2, the storage system 200 may include a node 210 and a node 230. The node 210 is also referred to as "first node" here, which is included in a domain 201, for example. The node 230 is also referred to as "second node" here, which is included in a domain 202, for example. The term "node" used herein can refer to a physical host, a server, a virtual machine, a container, a code segment running in the above entity, or the like. In some embodiments, the domain 201 and the domain 202 can be remote from each other. Although only one node is shown in each of the domain 201 and the domain 202, it is to be understood that this is merely for the purpose of illustration, without suggesting any limitation to the scope of the present disclosure. In some embodiments, each domain may include a plurality of nodes.

In the storage system 200, the node 210 may manage one or more disks 220, and the node 230 may manage one or more disks 240. The term "disk" as described here can refer to any non-volatile storage medium currently known or to be developed in the future, including but not limited to, a magnetic disk, a compact disk, a solid-state disk (SSD), a disk array consisting of various storage media or the like. The node 210 and the node 230 may be coupled to each other via a communication link 140 to enable cross-node backup of data. For example, the communication link 140 may include, but are not limited to, various wired or wireless networks. An application 250 may be any application program operable on a machine, which can transmit a data access request to the node 210 or the node 230.

The storage system 200 may be independent on a file system for data storage. In some embodiments, for example, the data in the storage system 200 can be stored as objects. The term "object" as described here can refer to a set of data and attribute information. The data is the content of the object (for example, user data from the application 250), while the attribution information (which is also referred to as "metadata") can indicate, for example, the size, modification time, storage path of the data or the like. In the storage system 200, a storage unit can be allocated for storing user data in the object. The term "storage unit" as described here can also be referred to as chunk, which can indicate a logical representation of a storage space. For example, a physical storage space provided by a storage device (for example, the disks 220 and/or the disks 240) can be divided into a plurality of chunks each having a fixed size, and each chunk may correspond to one storage unit.

For ease of description, it is assumed below that a request from the application 250 is sent to the node 210. For example, the application 250 may send, to the node 210, a request to create, modify and/or delete an object. The node 210 may perform a corresponding operation in response to the received request. That is, data is firstly updated at the node 210, and then synchronized or replicated to the node 230 via the communication link 140. It is to be understood that this is merely for the purpose of illustration, without any intention of limiting the scope of the present disclosure. In some embodiments, the request from the application 250 may also be sent to the node 230. That is, data may be firstly updated at the node 230, and then synchronized or replicated to the node 210. As shown in FIG. 2, the node 210 and the node 230 may have exactly the same structure. The node 210 is taken as an example below for illustration.

As shown in FIG. 2, in some embodiments, the node 210 may include an application request processing module 211, an object management module 212 and a storage unit management module 213. The application request processing module 211 may be configured to process various requests from the application 250. The object management module 212 may be configured to manage objects, for example, performing creation, modification and/or deletion of the objects. The storage unit management module 213 may be configured to allocate and reclaim storage units for storing one or more objects created at the node 210.

In some embodiments, the object management module 212 may perform operations of creation, modification and/or deletion of objects in response to receiving various requests. The object management module 212 may sequentially record operations executed on the objects in a journal and periodically synchronize the journal to the object management module 232 at the node 230. In some embodiments, since the operations prior to the system RPO have been synchronized, the object management module 212 can only send a sequence of operations after RPO to the object managing model 232. The object management module 232 may execute sequentially the sequence of operations recorded in the journal, so as to keep the node 230 and the node 210 in synchronization.

As described above, the user data in an object can be stored in a storage unit. In some embodiments, the storage unit management module 213 may be configured to allocate and reclaim storage units for storing one or more objects created at the node 210. When a certain storage unit is full, the storage unit can be "sealed", which means that the content in the storage unit cannot be modified any longer. When the storage unit is sealed, the storage unit management module 213 may synchronize the data in the storage unit to the storage unit management module 233 at the node 230. In some embodiments, the storage unit management module 233 may store, in a respective storage unit, the data received from the storage unit management module 213. Moreover, the storage unit management module 213 can maintain a reference count for each storage unit allocated, and the reference count, for example, can indicate a number of objects currently associated with the storage unit. In some embodiments, when a storage unit is allocated, the reference count thereof can be initialized to zero. When a new object is created or updated to the storage unit, the reference count can be incremented; and when an object is removed from the storage unit (for example, the object is deleted from the storage unit or updated to another storage unit), the reference count can be decremented. In some embodiments, when a reference count of a certain storage unit becomes zero, it indicates that the storage unit can be reclaimed.

In some embodiments, in order to improve the access efficiency, the data in the storage unit can be modified in an append-only mode. FIGS. 3A-3F illustrate diagrams of operating a storage unit in an append-only mode according to some embodiments of the present disclosure. In the example as shown in FIGS. 3A-3F, it is assumed that a storage unit 300 is allocated by the storage unit management module 213 to store data of one or more objects created at the node 210. Hereinafter, the storage unit 300 is sometimes referred to as "first storage unit."

In some embodiments, in response to receiving a request to create an object 310 from the application 250, the application request processing module 211 obtains, from the request, user data corresponding to the object, and transmits the user data to the storage unit management module 213. In response to an available storage area 301 is present in the storage unit 300, the storage unit management module 213 may send a message to the application request processing module 211, notifying that the user data corresponding to the object 310 is successfully written to the storage unit 300. The application request processing module 311 can transmit, to the object management module 312, an indication that the object 310 is created as well as metadata of the object 310 (for example, the data size, modification time, storage path and the like). The object management module 212 can record the creation of the object 310 and metadata of the object 310 in the journal. In response to the user data corresponding to the object 310 being stored in the area 301 of the storage unit 300, the storage unit management module 213 may increment the reference count of the storage unit 300.

Figure 3A:
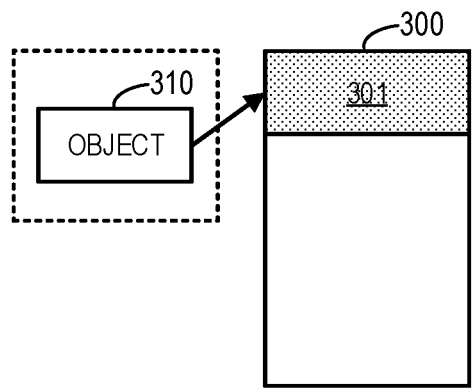
FIGS. 3A-3F are schematic diagrams showing operations on storage units in an append-only mode according to embodiments of the present disclosure.
Figure 3B:
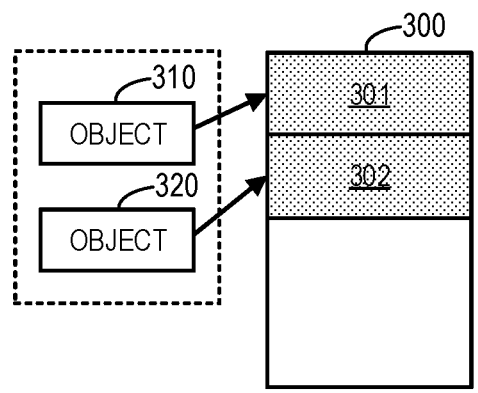

Similarly, an object 320 can be created, and data corresponding to the object 320 can be written into an available storage area 302 of the storage unit 300, as shown in FIG. 3B. In response to the user data corresponding to the object 320 being stored in the area 302 of the storage unit 300, the reference count of the storage unit 300 can be incremented.

Figure 3C:
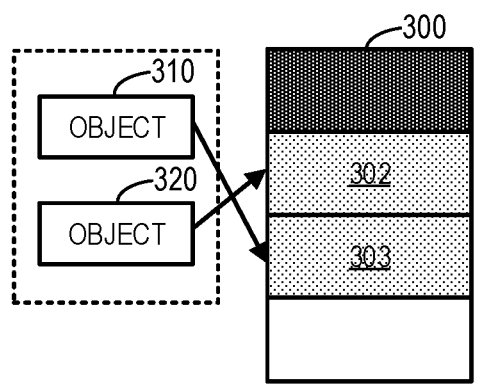

In some embodiments, in response to receiving, from the application 250, a request to modify the object 310, the application request processing module 211 may obtain user data for modifying the object 310 from the request, and transmits the user data to the storage unit management module 213. The storage unit management module 213 may not modify the data in the area 301, but sets the area 301 to be reclaimable and writes the user data of the object 310 into an available storage area 303 in the storage unit 300 in an appended-only manner, as shown in FIG. 3C. The storage unit management module 213 may send a message to the application request processing module 211, notifying that the user data corresponding to the object 310 is successfully written into the storage unit 300. The application request processing module 211 may transmit, to the object management module 212, an indication that the object 310 is modified as well as the updated metadata of the object 310, for recording in the journal. Since the data of the object 310 is still stored in the storage unit 300, the storage unit management module 213 keeps the reference count of the storage unit 300 unchanged.

Figure 3D:
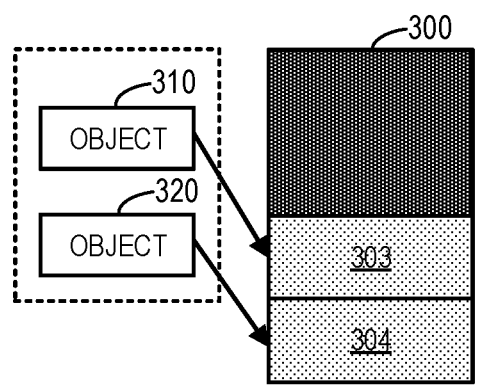

Similarly, the object 320 can be modified, in which the area 302 may be set to be reclaimable, and the user data for modifying the object 320 may be stored in an available storage area 304 in the storage unit 300, as shown in FIG. 3D. Assuming that the available storage space in the storage unit 300 is used up at this time, and thus the storage unit 300 can be "sealed", which means that the content in the storage unit 300 cannot be modified any longer. In the case, if a further object (not shown), other than the objects 310 and 320, is created, the storage unit management module 213 can allocate a further storage unit (not shown) for storing data of the further object. In addition, if the object 310 is modified again, the area 303 may be set to be reclaimable, and the user data for modifying the object 310 may be stored in the further storage unit, such that the reference count of the storage unit 300 will be decremented.

Figure 3E:
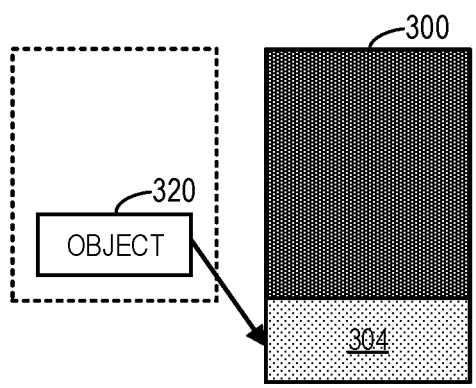

In some embodiments, in response to receiving a request to delete the object 310 from the application 250, the application request processing module 211 may transmit an indication to delete the object 310 to the object management module 212. The object management module 212 may record the deletion of the object 310 in the journal. The object management module 212 may indicate the deletion of the object 310 to the storage unit management module 213. The storage unit management module 213 may set the area 303 to be reclaimable and decrement the reference count of the storage unit 300, as shown in FIG. 3E.

Figure 3F:
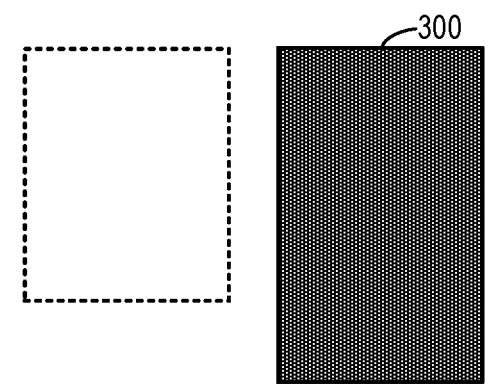

Similarly, as shown in FIG. 3F, if the object 320 is deleted, the area 304 for storing the data of the object 320 is set to be reclaimable. As such, all storage areas in the storage unit 300 are set to be reclaimable, and the number of the objects associated therewith (i.e., the reference count) becomes zero.

In some embodiments, when the reference count of the storage unit 300 becomes zero, or when all the areas in the storage unit 300 are set to be reclaimable, the storage unit management module 213 can reclaim the storage unit 300. For example, the storage unit management module 213 may release the space occupied by the storage unit 300, for use in the subsequent allocation. However, in some embodiments, if the data in the storage unit 300 have been synchronized to a further storage unit (which is also referred to as "second storage unit" here) at the node 230, the storage unit management module 213 needs to determine a condition for reclaiming the second storage unit and indicate the condition to the node 230, prior to reclaiming the storage unit 300.

As described above, the object management module 212 may record the sequence of operations performed on the objects in the journal. In some embodiments, the storage unit management module 213 may obtain, from the object management module 212, the journal recording the sequence of operations, and determine therefrom an operation which causes the reference count of the storage unit 300 to be zero or causes the last area in the storage unit 300 to be set as reclaimable. For example, in the example as shown in FIGS. 3A-3F, the deletion of the object 320 is the operation that causes the reference count of the storage unit 300 to be zero or causes the last area 304 in the storage unit 300 to be set as reclaimable. In some embodiments, the storage unit management module 213 may send a reclaiming command indicating the operation to the storage unit management module 233 at the node 230. In response to the reclaiming command being sent, the storage unit management module 213 can reclaim the storage unit 300.

In some embodiments, in response to receiving, from the storage unit management module 213, the reclaiming command indicating the operation, the storage unit management module 233 may indicate the operation to the object management module 232 at the node 230, for example. As described above, the object management module 232 may sequentially perform the sequence of operations received from the object management module 212, so as to keep the node 230 and the node 210 in synchronization. In response to the operation indicated by the storage unit management module 233 being performed by the object management module 232, the object management module 232 may send a message to the storage unit management module 233, indicating that the reclaiming condition of the second storage unit is satisfied. In response to receiving the message from the object management module 232, the storage unit management module 233 can reclaim the second storage unit acting as a backup of the storage unit 300. In some embodiments, the storage unit management module 233 may send a response for the reclaiming command to the storage unit management module 213, indicating that the second storage unit, acting as the backup of the storage unit 300, has been reclaimed.

Figure 4:
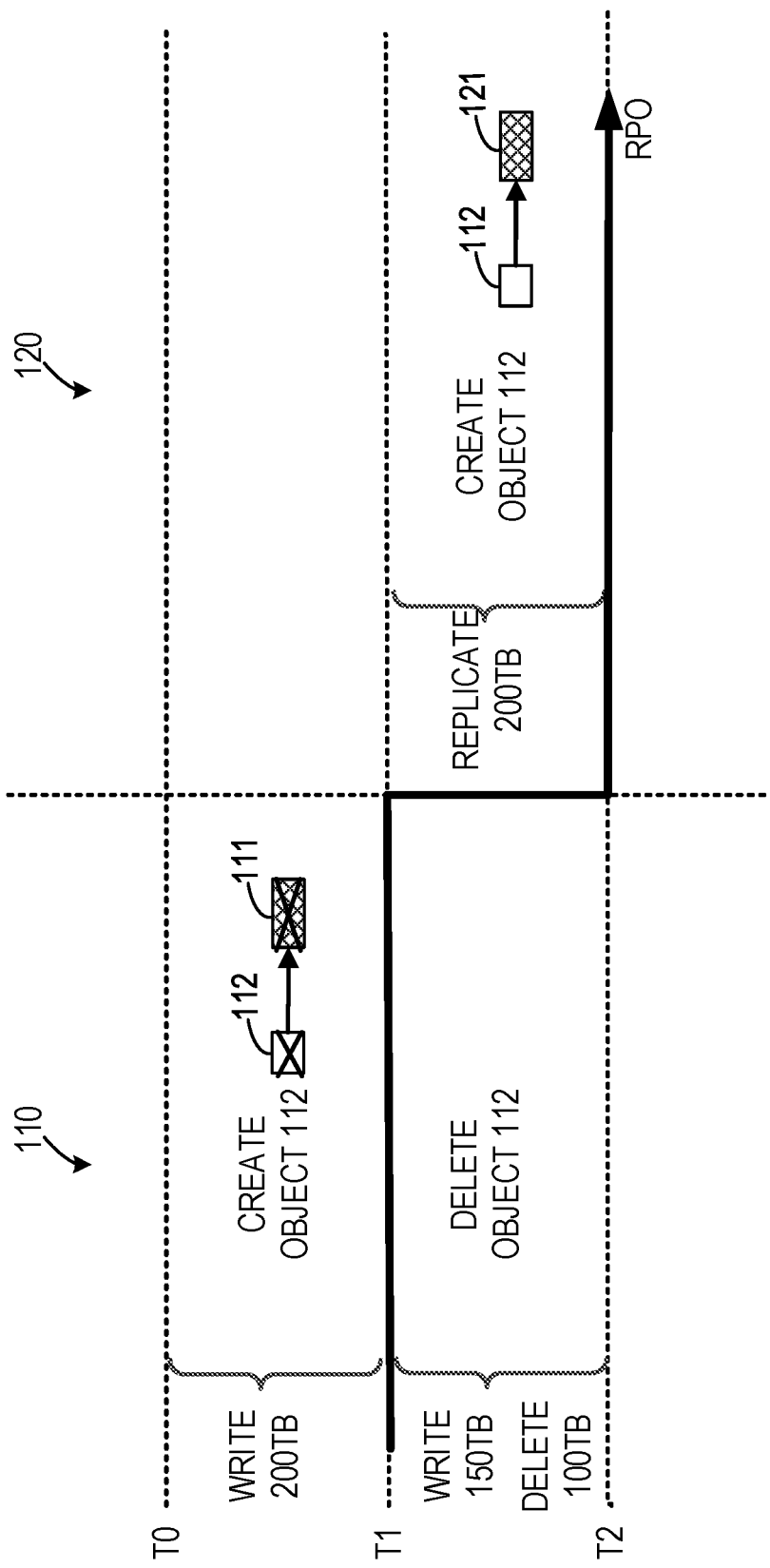
FIG. 4 is a schematic diagram showing management of storage units supporting offsite backup according to embodiments of the present disclosure.

FIG. 4 is a schematic diagram showing management of storage units supporting offsite backup according to embodiments of the present disclosure. For example, FIG. 4 illustrates a scenario where embodiments of the present disclosure are applied to the example as shown in FIGS. 1A and 1B.

In FIG. 4, from the time point T0 to the time point T1, a user writes 200 TB user data to the domain 110 and creates an object 112. Data corresponding to the object 112 is stored on the storage unit 111. At the time point T2, all the object creating operations and 200 TB user data are successfully replicated to the domain 120. For example, the object 112 is created in the domain 120, and the data corresponding thereto is stored on the storage unit 121. The object 112 in the domain 120 acts as a backup of the object 112 in the domain 110.

From the time point T1 to the time point T2, while waiting for all object creation operations and 200 TB user data to be replicated to the domain 120, the user writes further 150 TB data into the domain 110 and deletes 100 TB user data from the 200 TB user data written from the time point T0 to the time point T1. For example, the object 112 created before the time point T1 is deleted during this period. It is assumed here that the operation of deleting the object 112 from the domain 110 is identified as "journal_1" in the journal. When the object 112 in the domain 110 is deleted, the storage unit 111 can be set to be reclaimable immediately, and the storage unit 121 in the domain 120 can be set to be "recyclable once the operation journal_1 is executed". If the operation "journal_1" has not been executed in the domain 120 yet, the storage unit 121 will not be reclaimed. If a disaster occurs in the domain 110 at this time, the data of the domain 120 will be used for system recovery. In the case, since the storage unit 121 has not been reclaimed, the object 112 can be accessed successfully. Subsequently, after the operation "journal_1" is executed in the domain 120 (as shown in FIG. 1B, at the time point T3), the storage unit 121 will be reclaimed.

In this way, if the 100 TB data in the domain 110 are deleted, the storage unit corresponding to the 100 TB data can be reclaimed immediately, without waiting for the deletion operation to be synchronized to the domain 120. Therefore, the waste of the storage space in the domain 110 occurring at the time point T2 as shown in FIGS. 1A and 1B will not occur any longer.

Figure 5:
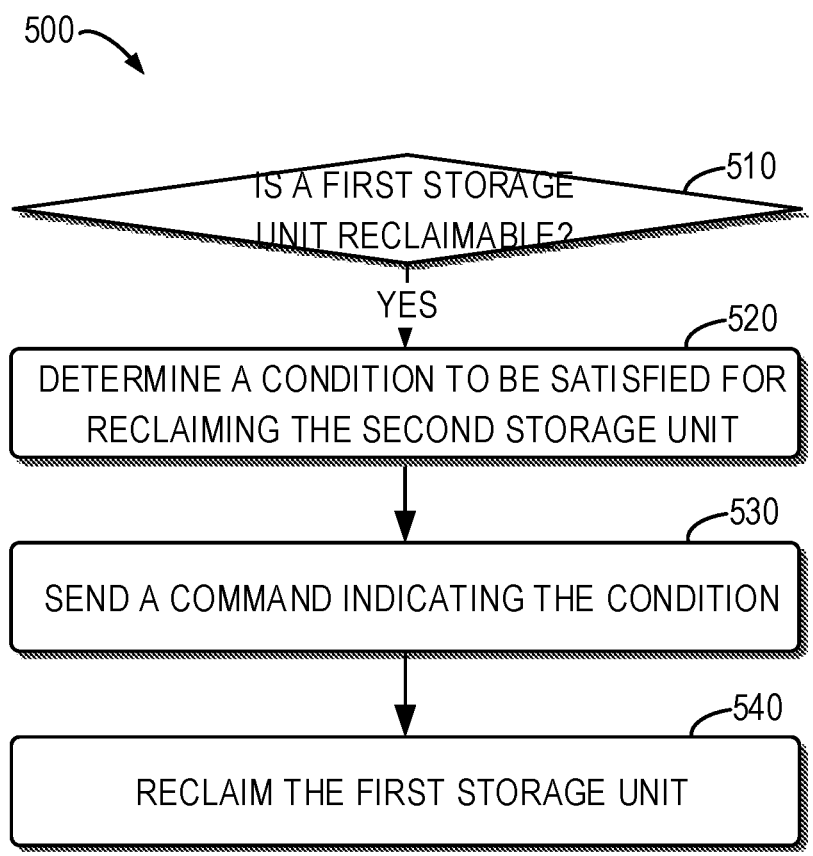
FIG. 5 illustrates a flowchart of an example method of managing storage units according to embodiments of the present disclosure.

FIG. 5 illustrates a flowchart of an example method 500 for managing storage units according to embodiments of the present disclosure. For example, the method 500 can be performed by the node 210 as shown in FIG. 2. It is to be understood that the method 500 can include additional acts not shown and/or can omit some shown acts, and the scope of the present disclosure is not limited in the aspect.

At 510, the node 210 determines whether a first storage unit allocated at the node 210 is reclaimable, where data in the first storage unit is backed up to a second storage unit at the node 230.

At 520, in response to determining that the first storage unit is reclaimable, the node 210 determines a condition to be satisfied for reclaiming the second storage unit.

At 530, the node 210 sends a command indicating the condition to the node 230, such that the node 230 reclaims the second storage unit in response to the condition being satisfied.

At 540, in response to the command being sent, the node 210 reclaims the first storage node.

In some embodiments, the first storage unit is allocated to store one or more objects created at the node 210. The node 210 determines whether the first storage unit is reclaimable by: determining a reference count of the first storage unit, wherein the reference count indicates a number of objects currently stored in the first storage unit; and in response to the reference count being a predetermined value, determining that the first storage unit is reclaimable.

In some embodiments, the method 500 further comprises: in response to the first storage unit being allocated, initializing the reference count with a predetermined initial value; in response to receiving, from an application, a request to perform an operation on one of one or more objects, performing the operation; and updating the reference count based on a result of the operation.

In some embodiments, the method 500 further comprises: in response to the operation on the one of the one or more objects being performed, recording the operation in a journal; and sending, to the node 230, the journal recording a sequence of operations performed on the one or more objects, such that the node 230 is synchronized with the node 210 by performing the sequence of operations.

In some embodiments, in response to receiving, from the application, a first request to create a first object in one or more objects, the node 210 obtains first data corresponding to the first object from the first request. In response to an available first storage area being present in the first storage unit, the node 210 creates the first object at least by storing the first data in the first storage area. In some embodiments, in response to the first data being stored in the first storage unit, the node 210 increments the reference count of the first storage unit.

In some embodiments, in response to receiving, from an application, a second request to create a second object in one or more objects, the node 210 obtains second data corresponding to the second object from the second request. In response to an available storage area being absent in the first storage unit, the node 210 backs up data in the first storage unit to the second storage unit. The node 210 allocates a third storage unit different from the first storage unit for storing the second data. In addition, the node 210 creates the second object at least by storing the second data in the third storage unit. In some embodiments, in response to the second data corresponding to the second object being stored in the third storage unit, the node 210 keeps the reference count of the first storage unit unchanged.

In some embodiments, in response to receiving, from an application, a third request to update the first object, the node 210 obtains third data corresponding to the updated first object from the third request. In response to an available second storage area being present in the first storage unit, the node 210 updates the first object at least by setting the first storage area to be reclaimed and by storing the second data in the second storage area, wherein the second storage area is different from the first storage area. In some embodiments, in response to the third data corresponding to the updated first object being still stored in the first storage unit, the node 210 keeps the reference count of the first storage unit unchanged.

In some embodiments, in response to receiving, from the application, a third request to update the first object, the node 210 obtains third data corresponding to the updated first object from the third request. In response to an available storage area being absent in the first storage unit, the node 210 backs up data in the first storage unit to the second storage unit. The node 210 allocates a third storage unit different from the first storage unit for storing the third data. The node 210 updates the first object at least by setting the first storage area to be reclaimed and by storing the third data in the third storage unit. In some embodiments, in response to the third data corresponding to the updated first object being stored in the third storage unit different from the first storage unit, the node 210 decrements the reference count of the first storage unit.

In some embodiments, in response to receiving, from the application, a fourth request to delete the first object, the node 210 deletes the first object at least by setting the first storage area to be reclaimed. In some embodiments, in response to the first object being deleted, the node 210 decrements the reference count of the first storage unit.

In some embodiments, the first storage unit includes one or more storage areas. The node 210 determines whether the first storage unit is reclaimable by: in response to each of the one or more storage areas being set to be reclaimed, determining that the first storage unit is reclaimable.

In some embodiments, the node 210 determines the condition by: determining, from the journal recording a sequence of operations performed on the one or more objects, an operation causing the reference count to become the predetermined value; and determining the condition as that the operation is performed at the node 230.

In some embodiments, the node 210 determines the condition by: determining, from the journal recording a sequence of operations performed on the one or more objects, an operation causing the last one of the one or more storage areas to be set to be reclaimed; and determining the condition as that the operation is performed at the node 230.

In some embodiments, the node 210 is located at a first location, and the node 230 is located at a second location away from the first location.

Figure 6:
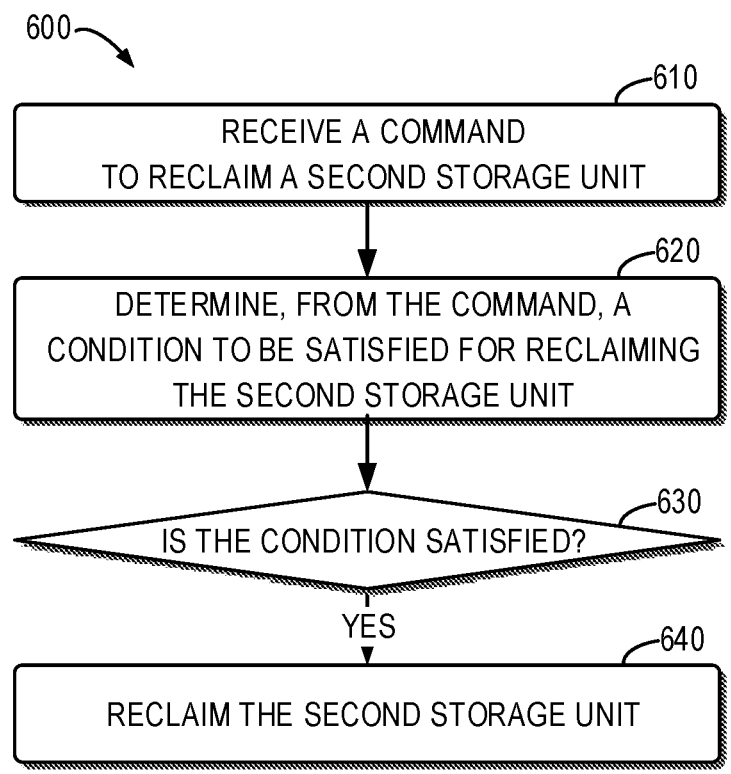
FIG. 6 illustrates a flowchart of an example method of managing storage units according to embodiments of the present disclosure.

FIG. 6 illustrates a flowchart of an example method 600 of managing storage units according to embodiments of the present disclosure. For example, the method 600 can be performed by the node 230 as shown in FIG. 2. It is to be understood that the method 600 can include additional acts not shown and/or can omit some shown acts, and the scope of the present disclosure is not limited in the aspect.

At 610, the node 230 receives, from the node 210, a command to reclaim the second storage unit at the node 230, where data in the first storage unit at the node 210 is backed up to the second storage unit.

At 620, the node 230 determines, from the command, a condition to be satisfied for reclaiming the second storage unit.

At 620, the node 230 determines whether the condition is satisfied.

At 630, in response to the condition being satisfied, the node 230 reclaims the second storage unit.

In some embodiments, the first storage unit is allocated to store one or more objects created at the node 210. The method 600 further comprises: in response to receiving, from the node 210, a journal recording a sequence of operations performed on the one or more objects at the first storage unit, performing the sequence of operations on the second storage unit to keep synchronization with the node 210.

In some embodiments, the condition indicates an operation in the sequence of operations. The node 230 reclaims the second storage unit in response to the operation being performed.

In some embodiments, the node 210 is located at a first location, and the node 230 is located at a second location away from the first location.

Figure 7:
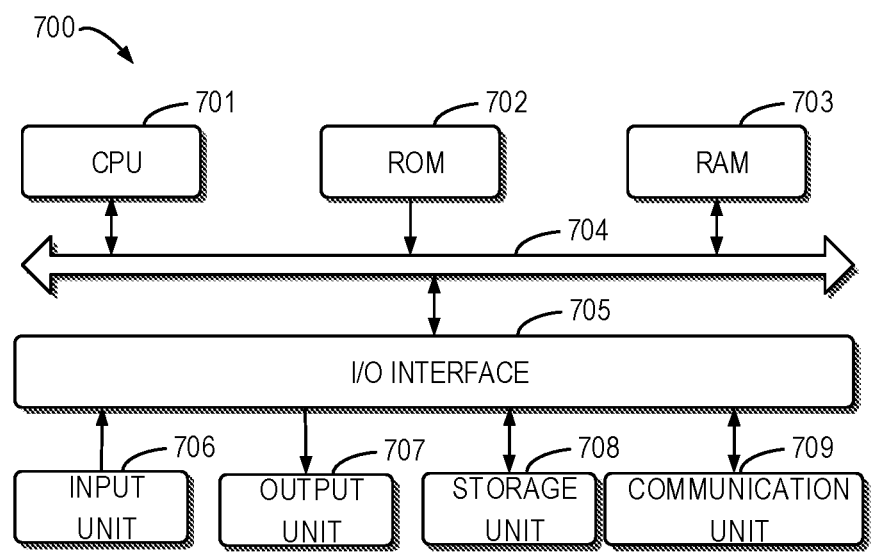
FIG. 7 illustrates a diagram of an example device that can be used to implement embodiments of the present disclosure.

FIG. 7 illustrates a block diagram of an example device 700 that can be used to implement the embodiments of the present disclosure. For example, the node 210 and/or the node 230 as shown in FIG. 2 can be implemented by the device 700. As shown in FIG. 7, the device 700 includes a central processing unit (CPU) 701 which performs various appropriate actions and processing, based on a computer program instruction stored in a read-only memory (ROM) 702 or a computer program instruction loaded from a storage unit 708 to a random access memory (RAM) 703. The RAM 703 stores therein various programs and data required for operations of the device 700. The CPU 701, the ROM 702 and the RAM 703 are connected via a bus 704 with one another. An input/output (I/O) interface 705 is also connected to the bus 704.

The following components in the device 700 are connected to the I/O interface 705: an input unit 706 such as a keyboard, a mouse and the like; an output unit 707 including various kinds of displays and a loudspeaker, etc.; a storage unit 708 including a magnetic disk, an optical disk, and etc.; a communication unit 709 including a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the method 500 and/or 600, may be executed by the processing unit 701. For example, in some embodiments, the method 500 and/or 600 may be implemented as a computer software program that is tangibly included in a machine readable medium, e.g., the storage unit 708. In some embodiments, part or all of the computer programs may be loaded and/or mounted onto the device 700 via ROM 702 and/or communication unit 709. When the computer program is loaded to the RAM 703 and executed by the CPU 701, one or more steps of the method 500 and/or 600 as described above may be executed.

In another embodiment, an apparatus for managing storage units comprises at least one processing unit, and at least one memory coupled to the at least one processing unit and storing instructions for execution by the at least one processing unit. The instructions, when executed by the at least one processing unit, cause the apparatus to perform operations, comprising: receiving, at a second node comprising a processor, a command to reclaim a second storage unit at the second node from a first node, wherein data in a first storage unit at the first node is backed up to the second storage unit, determining, from the command, a condition to be satisfied for reclaiming the second storage unit, and in response to the condition being satisfied, reclaiming the second storage unit.

In another embodiment, a storage system comprises at least a first node and a second node, the first node being communicatively coupled to the second node, wherein: the first node comprises at least a first apparatus configured to perform first operations, comprising: determining whether a first storage unit allocated at a first node is reclaimable, wherein data in the first storage unit is backed up to a second storage unit at a second node; in response to determining that the first storage unit is reclaimable, determining a condition to be satisfied for reclaiming the second storage unit; sending a command indicating the condition to the second node, such that the second node reclaims the second storage unit in response to the condition being satisfied, and in response to the command being sent, reclaiming the first storage unit, and the second node comprises at least a second apparatus configured to perform second operations, comprising: receiving, at a second node comprising a processor, a command to reclaim a second storage unit at the second node from a first node, wherein data in a first storage unit at the first node is backed up to the second storage unit, determining, from the command, a condition to be satisfied for reclaiming the second storage unit, and in response to the condition being satisfied, reclaiming the second storage unit. Optionally, with the storage system, the first node can be located at a first location and the second node can be located at a second location remote from the first location.

In yet another embodiment, a computer program product tangibly stored in a non-transient computer storage medium is provided, and comprising machine executable instructions, the machine executable instructions, when executed by a device, cause the device to perform operations, comprising: determining whether a first storage unit allocated at a first node is reclaimable, wherein data in the first storage unit is backed up to a second storage unit at a second node, in response to determining that the first storage unit is reclaimable, determining a condition to be satisfied for reclaiming the second storage unit, sending a command indicating the condition to the second node, such that the second node reclaims the second storage unit in response to the condition being satisfied, and, in response to the command being sent, reclaiming the first storage unit.

In yet another embodiment, a computer program product tangibly stored in a non-transient computer storage medium is provided and comprising machine executable instructions, the machine executable instructions, when executed by a device, cause the device to perform operations, comprising: determining whether a first storage unit allocated at a first node is reclaimable, wherein data in the first storage unit is backed up to a second storage unit at a second node, in response to determining that the first storage unit is reclaimable, determining a condition to be satisfied for reclaiming the second storage unit, sending a command indicating the condition to the second node, such that the second node reclaims the second storage unit in response to the condition being satisfied, and, in response to the command being sent, reclaiming the first storage unit.

The present disclosure may be a method, a device, a system, and/or a computer program product. The computer program product may include a computer readable storage medium having computer readable program instructions thereon for causing a processor to carry out aspects of the present disclosure.

The computer readable storage medium can be a tangible apparatus that can retain and store instructions for use by an instruction execution apparatus. The computer readable storage medium may be, for example, but is not limited to, an electronic storage apparatus, a magnetic storage apparatus, an optical storage apparatus, an electromagnetic storage apparatus, a semiconductor storage apparatus, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable devices or other apparatus to produce a computer implemented process, such that the instructions which are executed on the computer, other programmable apparatus, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of reclaiming storage units, comprising:
    receiving, by a system comprising a processor, a request to perform an operation from an application;
    in response to the operation being performed, recording the operation in a journal recording of a sequence of operations that have been performed, wherein the operation is part of the sequence of operations;
    determining that a first storage unit, allocated to store one or more objects at a first node, is reclaimable to store second data representative of a second object created at the first node, wherein first data representative of a first object in the first storage unit is backed up to a second storage unit at a second node;
    in response to the determining that the first storage unit is reclaimable to store the second data representative of the second object created at the first node, determining a condition to be satisfied for reclaiming the second storage unit;
    sending a command indicating the condition to the second node, such that the second node reclaims the second storage unit in response to the condition being satisfied; and
    in response to the command being sent, reclaiming the first storage unit to store the second data representative of the second object created at the first node.

2. The method of claim 1, wherein the determining that the first storage unit is reclaimable comprises:
    determining a reference count of the first storage unit, wherein the reference count indicates a number of objects currently stored in the first storage unit; and
    in response to the reference count being a predetermined value, determining that the first storage unit is reclaimable.

3. The method of claim 2, wherein the operation is performed on one object of the one or more objects, and the method further comprises:
    in response to the first storage unit being determined to be reclaimable, initializing the reference count with a predetermined initial value;
    in response to receiving, from the application, the request to perform the operation on the one object of the one or more objects, performing the operation on the one object of the one or more objects; and
    updating the reference count based on a result of the operation performed on the one object of the one or more objects.

4. The method of claim 3, wherein the journal recording of the sequence of operations is performed on the one or more objects, and the method further comprises:
    in response to the operation on the one object of the one or more objects being performed, recording the operation performed on the one object of the one or more objects in the journal recording of the sequence of the operations performed on the one or more objects, wherein the operation performed on the one object of the one or more objects is part of the sequence of operations performed on the one or more objects; and
    sending, to the second node, the journal recording of the sequence of operations performed on the one or more objects, such that the second node is synchronized with the first node by performing the sequence of operations.

5. The method of claim 3,
    wherein the performing the operation comprises:
        in response to receiving, from the application, a first request to create the second object in the one or more objects, obtaining the second data representative of the second object from the first request; and
        in response to an available first storage area being present in the first storage unit, creating the first object at least by storing the second data representative of the second object in the first storage area; and
    wherein the updating the reference count comprises:
        in response to the second data representative of the second object being stored in the first storage unit, incrementing the reference count.

6. The method of claim 3,
    wherein the performing the operation comprises:
        in response to receiving, from the application, a first request to create the second object in the one or more objects, obtaining the second data representative of the second object from the first request;
        in response to an available storage area being absent in the first storage unit, backing up the first data representative of the first object in the first storage unit to the second storage unit;

allocating, at the first node, a third storage unit different from the first storage unit for storing the second data representative of the second object; and creating the second object at least by storing the second data representative of the second object in the third storage unit; and wherein the updating the reference count comprises:
in response to the second data representative of the second object being stored in the third storage unit, keeping the reference count unchanged.

7. The method of claim 5, wherein the performing the operation comprises:
in response to receiving, from the application, a second request to update the second object to create an updated second object, obtaining third data representative of the updated second object from the second request; and in response to an available second storage area being present in the first storage unit, updating the second object at least by setting the first storage area to be reclaimed and by storing the second data representative of the second object in the second storage area, wherein the second storage area is different from the first storage area; and wherein the updating the reference count comprises:
in response to the third data representative of the updated second object being stored in the first storage unit, keeping the reference count unchanged.

8. The method of claim 5, wherein the performing the operation comprises:
in response to receiving, from the application, a second request to update the second object to create an updated second object, obtaining third data representative of the updated second object from the second request;

in response to an available storage area being absent in the first storage unit, backing up the second data representative of the second object in the first storage unit to the second storage unit;

allocating, at the first node, a third storage unit different from the first storage unit for storing the third data representative of the updated second object; and updating the second object at least by setting the first storage area to be reclaimed and by storing the third data representative of the updated second object in the third storage unit; and wherein the updating the reference count comprises:
in response to the third data representative of the updated second object being stored in the third storage unit, decrementing the reference count.

9. The method of claim 5, wherein the performing the operation comprises:
in response to receiving, from the application, a second request to delete the second object, deleting the second object at least by setting the first storage area to be reclaimed; and wherein the updating the reference count comprises:
in response to the second object being deleted, decrementing the reference count.

10. The method of claim 1, wherein the first storage unit includes one or more storage areas, and wherein the determining that the first storage unit is reclaimable comprises:
in response to each storage area of the one or more storage areas being set to be reclaimed, determining that the first storage unit is reclaimable.

11. The method of claim 1, wherein the journal recording of the sequence of operations is performed on the one or more objects, and wherein the determining the condition comprises:
determining, from the journal recording of the sequence of operations performed on the one or more objects, a reference count operation causing the reference count to become a predetermined value; and determining that the reference count operation is performed at the second node.

12. The method of claim 1, wherein the journal recording of the sequence of operations is performed on the one or more objects, and wherein the determining the condition comprises:
determining, from the journal recording of the sequence of operations performed on the one or more objects, a reclaim operation of the sequence of operations causing a last storage area of the one or more storage areas to be set to be reclaimed; and determining that the reclaim operation is performed at the second node.

13. The method of claim 1, wherein the first node is located at a first location and the second node is located at a second location remote from the first location.

14. A method of reclaiming storage units, comprising:
receiving, at a second node comprising a processor, a command to reclaim a second storage unit to store second data representative of a second object created at the second node from a first node, wherein first data representative of a first object in a first storage unit at the first node is backed up to the second storage unit, and wherein the first storage unit is allocated to store one or more objects created at the first node;

determining, from the command, a condition for reclaiming the second storage unit, wherein the condition indicates an operation, and wherein the operation is recorded in a journal recording of a sequence of operations; and in response to the determining the condition, reclaiming the second storage unit to store the second data representative of the second object.

15. The method of claim 14, wherein the sequence of operations is performed on the one or more objects at the first storage unit, and the method further comprises:
in response to receiving, from the first node, the journal recording of the sequence of operations performed on the one or more objects at the first storage unit, performing the sequence of operations on the second storage unit to keep synchronization with the first node.

16. The method of claim 15, wherein the operation is in the sequence of operations, and wherein the reclaiming the second storage unit comprises:
in response to the operation being performed, reclaiming the second storage unit.

17. The method of claim 14, wherein the first node is located at a first location and the second node is located at a second location remote from the first location.

18. An apparatus for reclaiming storage units, comprising:
at least one processing unit; and
at least one memory coupled to the at least one processing unit and storing instructions for execution by the at least one processing unit, the instructions, when executed by the at least one processing unit, causing the apparatus to perform operations, comprising:
performing a task in response to a request received from an application;

recording the task in a journal recording of a sequence of tasks;

determining that a first storage unit, allocated to store one or more objects created at a first node, is reclaimable to store second data representative of a second object created at the first node, wherein first data representative of a first object in the first storage unit is backed up to a second storage unit at a second node;

in response to the determining that the first storage unit is reclaimable to store the second data representative of the second object created at the first node, determining a condition to be satisfied for reclaiming the second storage unit;

sending a command indicating the condition to the second node, such that the second node reclaims the second storage unit in response to the condition being satisfied; and in response to the command being sent, reclaiming the first storage unit to store the second data representative of the second object created at the first node.

19. The apparatus of claim 18, wherein the determining that the first storage unit is reclaimable comprises:

determining a reference count of the first storage unit, wherein the reference count indicates a number of objects currently stored in the first storage unit; and in response to the reference count being a predetermined value, determining that the first storage unit is reclaimable.

20. The apparatus of claim 19, wherein the task is performed on one object of the one or more objects, and wherein the operations further comprise:

in response to the first storage unit being determined to be reclaimable, initializing the reference count with a predetermined initial value;

in response to receiving, from the application, the request to perform the task on the one object of the one or more objects, performing the task; and updating the reference count based on a result of the task performed on the one object of the one or more objects.

* * * * *